(No Model.)
E. W. ARMS.
SOLAR SURVEYING INSTRUMENT.
No. 423,894. Patented Mar. 25, 1890.
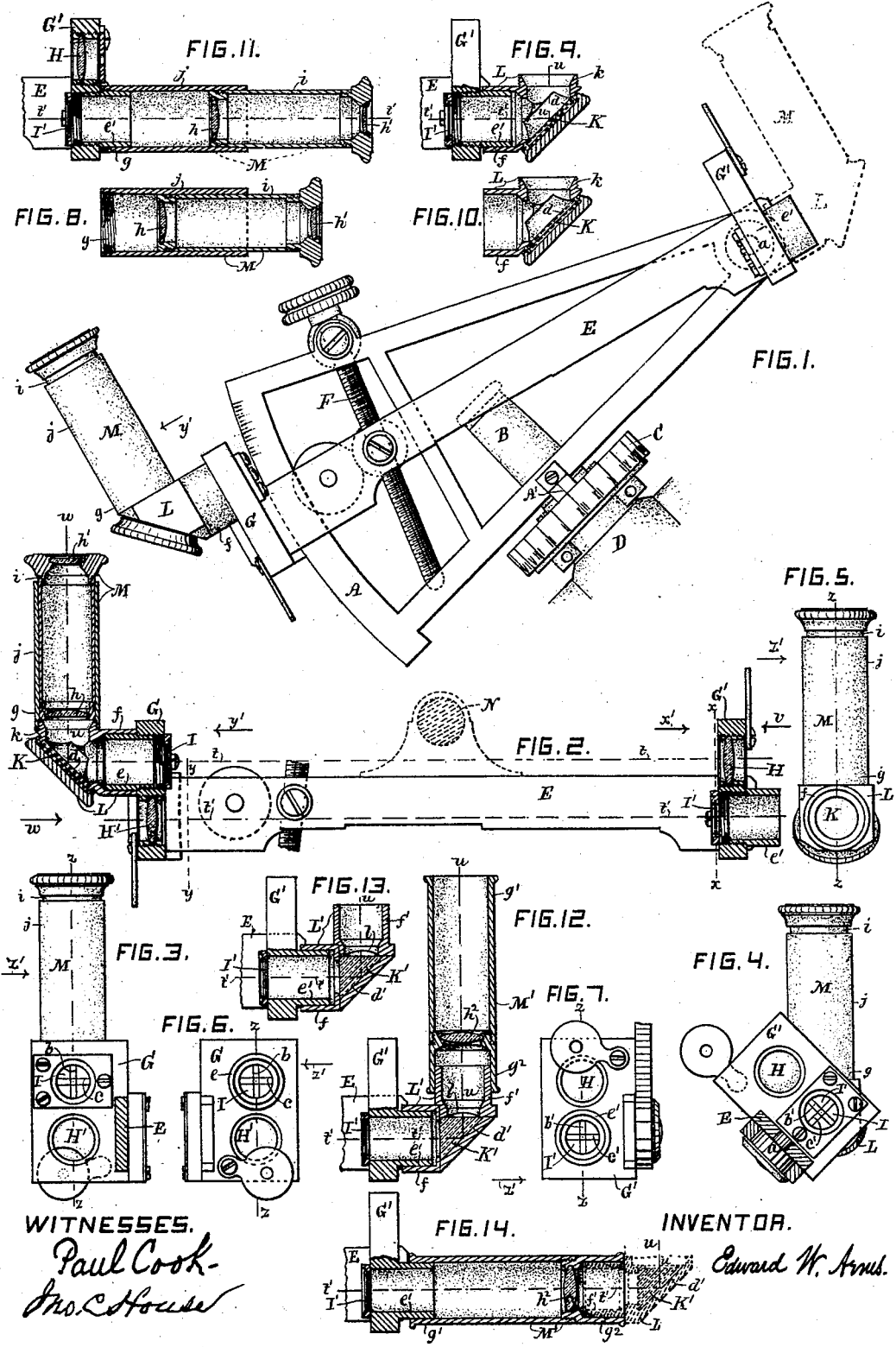

UNITED STATES PATENT OFFICE.

EDWARD W. ARMS, OF LANSINGBURG, ASSIGNOR TO W. & L. E. GURLEY, OF TROY, NEW YORK.

SOLAR SURVEYING-INSTRUMENT.

SPECIFICATION forming part of Letters Patent No. 423,894, dated March 25, 1890.

Application filed December 9, 1889. Serial No. 333,019. (No model.)

To all whom it may concern:

Be it known that I, EDWARD W. ARMS, a citizen of the United States, residing in the village of Lansingburg, in the county of Rensselaer and State of New York, have invented a new and useful Improvement in Solar Surveying-Instruments, of which the following is a specification, reference being had to the accompanying drawings.

This invention relates to such solar surveying-instruments as have a solar lens combined with an image-plate having on it hour and equatorial lines in the focus of said lens and exposed to view with the sun's image when it is projected on said plate by the lens.

The general objects of this invention are to provide such instruments with simple and excellent means whereby a person can more conveniently, quickly, and accurately observe the position of the sun's image in relation to the hour and equatorial lines on the image-plate. In attaining said objects I combine with the solar lens a semi-transparent image-plate having on it hour and equatorial lines in the focus of said lens and exposed to view or visible at the side of the image-plate farthest from the lens or at the two opposite sides of the image-plate. I also combine therewith a magnifying eye-piece and a reflector facing the side of the image-plate farthest from the lens, and have said reflector or reflector and magnifying eye-piece adjustable about the line of the optical axis of said lens.

In the aforesaid drawings, Figure 1 represents a side elevation of a solar device having a declination-arc mounted to revolve about a polar axis and a pivoted arm or bar traversing said arc and carrying at its ends correlative solar lenses and image-plates and embodying one form of my invention. Fig. 2 is a side elevation of said arm or bar, with my invention shown in section, taken in the plane of the line $z\,z$ in Figs. 3, 5, 6, and 7 and viewed in the direction of the arrow $z'$. Fig. 3 is an elevation of the portion at the left hand of the line $y\,y$ in Fig. 2 as seen in the direction of the arrow $y'$. Fig. 4 is an elevation of the portion at the right hand of the line $x\,x$ in Fig. 2 when inclined and with the part shown in Fig. 5 added and viewed in the direction of the arrow $x'$. Fig. 5 is a face elevation of the combined reflector and eye-piece shown in Figs. 1, 2, 3, and 4 as seen in the direction of the arrow $y'$. Fig. 6 is an end elevation of the portion at the left hand in Fig. 2 without the combined reflector and eye-piece and as viewed in the direction of the arrow $w$. Fig. 7 is an end elevation of the portion at the right hand in Fig. 2 as viewed in the direction of the arrow $v$. Fig. 8 shows a longitudinal section of only the magnifying eye-piece in Figs. 1, 2, 3, 4, 5, and 11. Fig. 9 represents in section the reflector and its holder combined with the right-hand-end part of Fig. 2, and Fig. 10 shows a section of the same reflector and its holder detached. Fig. 11 shows in section the eye-piece of Figs. 1, 2, 3, 4, 5, and 8 applied directly to the right-hand-end part of Fig. 2. Fig. 12 shows the right-hand-end part of Fig. 2 in combination with a modified magnifying eye-piece and reflector represented in section. Fig. 13 represents in section only the reflector and its holder of Fig. 12 applied to the right-hand-end part of Fig. 2. Fig. 14 shows in section the magnifying eye-piece of Fig. 12 combined directly with the right-hand-end part of Fig. 2.

A is the declination-arc, mounted to rotate about a polar axis at B, and having an index A' for an hour-circle C, mounted with the polar axis on a part D of the telescope of a surveying-instrument, and E is the index arm or bar, pivoted at $a$, Fig. 1, and traversing said declination-arc by means of the screw F, and having at its ends holders G G', in which are mounted solar lenses H H', all essentially the same as in many solar surveying-instruments prior to this invention.

In such prior instruments each image-plate having thereon hour and equatorial lines in the focus of the opposite lens was opaque, so that said lines and the sun's image projected on the plate by the lens were visible or exposed to view only at the side of the image-plate facing the lens, and so that it was often quite difficult for a person manipulating the instrument to very quickly and accurately observe the place of the moving sun's image in relation to the hour and equatorial lines on the image-plate when variously inclined, according to the positions of the sun in altitude and azimuth.

To facilitate the observation of the sun's image in respect to the hour and equatorial lines on the image-plate, I have those lines on an image-plate which is translucent or semi-transparent, and which is visible or exposed to view at its two opposite sides, and which is sufficiently opaque to allow the image and lines to be clearly seen on the side facing the lens, and is transparent enough to permit the image and lines to be plainly observed at the opposite side of the image-plate, so that a person in using the instrument can observe the image and lines at either side or at both sides of the image-plate, as shall be most convenient or desirable. I represents such a semi-transparent image-plate secured to the holder G and facing and in the focus of the solar lens H, and with its two opposite sides visible, and I' is a like image-plate secured to the holder G' and facing and in the focus of the lens H' and exposed to view at both sides. On the image-plate I are the crossing hour-lines $b$ and equatorial lines $c$, and the image-plate I' has on it hour-lines $b'$ and equatorial lines $c'$. These image-plates can be of any suitable thin and translucent or semi-transparent material. I commonly have each image-plate consist of a very thin translucent or semi-transparent plate of celluloid having the hour and equatorial lines cut in the side thereof facing the lens. Such an image-plate may be prepared from a very thin transparent or nearly transparent plate of celluloid by first engraving the lines in one face thereof and then staining or coloring that face, so as to render the plate suitably semi-transparent and the lines conspicuous.

To enable a person to more readily observe the position of the sun's image in relation to the lines on the image-plate, I combine with the solar lens and its correlative semi-transparent image-plate a reflector facing and inclined to the side of the image-plate farthest from said lens and exposed to view, so that a person can look into the reflector in a direction perpendicular or at an angle to the line of the optical axis of said lens, and thereby very conveniently observe the position of the sun's image in respect to the lines on the image-plate.

K or K' indicates a reflector, which in Figs. 2, 9, 12, 13, and 14 is shown facing and inclined to the side of the semi-transparent image-plate farthest from its coacting lens and exposed to view in the direction of a line $u\ u$ perpendicular or at an angle to the line $t\ t$ or $t'\ t'$ of the optical axis of said lens. The reflector can be an opaque plate with a highly-polished reflecting-surface, as $d$ in Figs. 2, 9, and 10, or the reflector can be a transparent polished refracting-prism having its side $d'$, Figs. 12, 13, and 14, inclined to and opposite the image-plate.

To further facilitate the inspection of the sun's image in relation to the lines on the semi-transparent image-plate when it is variously inclined in using the instrument, I make the aforesaid reflector readily adjustable in an arc of a circle about the line of the optical axis of the lens coacting with the image-plate, so as to thereby enable a person to look into the reflector and inspect the image-plate in the most convenient direction whatever shall be the inclination of the image-plate in observing the sun in the forenoon, afternoon, or at mid-day at various latitudes. To make the reflector thus adjustable, I commonly furnish the image-plate holder G or G' with a cylindrical tubular portion $e$ or $e'$, surrounding and extending beyond the side of the image-plate farthest from its coacting lens and about concentric with the line of the optical axis of that lens, and I make the hollow reflector-holder L or L' with a tubular part $f$ inclined to the reflector K or K', and adapted to fit closely upon or within said tubular portion $e$ or $e'$ and to be turned circumferentially in relation thereto when supported thereby.

By having the tubular portion $e$ or $e'$ on the image-plate-holder and the corresponding tubular part $f$ on the reflector-holder the latter can be readily applied to, adjusted upon, and detached from the image-plate holder. When the reflector-holder is thus detached, the tubular portion $e$ or $e'$ of the image-plate holder then surrounds and shades the side of the semi-transparent image-plate farthest from its coacting lens, and thereby renders the sun's image and the hour and equatorial lines more conspicuous at that side of the image-plate.

To provide convenient means for observing the lines and sun's image on the semi-transparent image-plate with greater distinctness and accuracy than can be done by the unaided eye, I combine with the solar lens and its coacting image-plate a magnifying eye-piece facing or directed to receive the image of the side of the image-plate farthest from said lens. Accordingly in Figs. 11 and 14 the magnifying eye-piece M or M' is shown directly facing the side of the image-plate I' farthest from its correlative lens H', Fig. 2, and with the optical axis of the eye-piece in line with the line $t'\ t'$ of the optical axis of said lens, and with the tubular end part $g$ or $g'$ of the eye-piece fitting closely and nicely upon the tubular portion $e'$ of the image-plate holder, so that the eye-piece can be slid lengthwise and turned circumferentially on the part $e'$ to suit the eye of the observer.

In combining a magnifying eye-piece with the solar lens and image-plate I commonly combine with the eye-piece a reflector facing and inclined to the eye-piece and facing and inclined to the side of the image-plate farthest from the lens, so that a person can generally more conveniently observe the magnified lines and solar image on the image-plate by looking into the combined eye-piece and reflector in a direction perpendicular or at an angle to the line of the optical axis of the solar lens. In Figs. 2, 12, and 14 the reflector K or K' is shown thus combined with the magnifying eye-piece M or M' and the semi-transparent image-plate I or I' of the instrument. In Figs. 1, 2, 3, 4, and 12 the reflector is interposed between the eye-piece and the image-plate, as I generally prefer. In Fig. 14 the magnifying eye-piece M' is between the image-plate I' and the reflector K', which is there represented by broken or dotted lines.

In combining the combined reflector and magnifying eye-piece with the semi-transparent image-plate and its coacting solar lens I commonly make the reflector or the combined reflector and eye-piece adjustable in an arc of a circle about the line of the optical axis of the lens, whereby a person is enabled to more conveniently inspect the magnified lines and sun's image of the image-plate when the image-plate is variously inclined. This is accomplished in Figs. 1, 2, 3, 4, and 12 by having the tubular part $f$ of the reflector-holder fit and adjustable circumferentially upon the correlative tubular portion $e$ or $e'$ of the image-plate holder, and in Fig. 14 by having the tubular end part $g'$ of the eye-piece adjustable around the tubular part $e'$ of the image-plate holder, or by having the tubular part $f'$ of the reflector-holder adjustable circumferentially within the tubular end part $g^2$ of the eye-piece.

In Figs. 1, 2, 3, 4, 5, 8, and 11 the magnifying eye-piece has two lenses $h\,h'$, mounted in the tube $i$, which is adjustable endwise in the tube $j$, which is shown in Fig. 2 as having its threaded cylindrical end part $g$ screwed upon the threaded tubular part $k$, Figs. 9 and 10, of the reflector-holder L, and in Fig. 11 as fitting upon the tubular portion $e'$ of the image-plate holder.

In Figs. 12 and 14 the magnifying eye-piece has only one lens $h^2$, which is mounted in a tubular case, which is shown in Fig. 12 with its end part $g^2$ fitting upon the tubular part $f'$ of the reflector-holder L', and in Fig. 14 with its other end part $g'$ fitting upon the tubular portion $e'$ of the holder of the image-plate.

I commonly have the two tubular parts $e\,e'$, Fig. 2, of equal size, so that one and the same reflector, magnifying eye-piece, or combined magnifying eye-piece and reflector furnished with a tubular part, as $f$, $g$, or $g'$, of suitable size, will fit and can be used upon either the part $e$ or $e'$ of the holders G G' of the solar lenses and image-plates, as may be proper when the declination of the sun shall be north or south.

I sometimes have one or both of the shorter sides of the prism K', Figs. 12 and 13, convex, as indicated by the curved line $l$, to serve as a lens or magnifying eye-piece.

It is generally of importance to have the side of the image-plate facing the lens exposed to view, so that a person by looking at that side of the image-plate can manipulate the instrument so as to bring the sun's image approximately between the lines on that plate more quickly than if that side of the image-plate were covered from view.

In carrying out my invention the arm or bar E, or its equivalent, with the above-described attached devices for observing the sun, is commonly mounted to traverse a declination-arc, as shown in Fig. 1, but can be mounted on trunnions, as indicated by dotted lines at N in Fig. 2, and used in the place of and as an improved substitute for the telescope heretofore mounted on trunnions and used for observing the sun in some solar surveying-instruments.

I claim as my invention—

1. In a solar surveying-instrument, the combination, with its solar lens, of a semi-transparent image-plate having on it hour and equatorial lines in the focus of said lens and exposed to view or visible at the two opposite sides of said image-plate, substantially as set forth.

2. In a solar surveying-instrument, the combination, with its solar lens, of a semi-transparent image-plate having on it hour and equatorial lines in the focus of said lens and visible at the side facing said lens, and a reflector opposite and inclined to the other side of said image-plate and exposed to view, substantially as set forth.

3. In a solar surveying-instrument, the combination, with its solar lens, of a semi-transparent image-plate having on it hour and equatorial lines in the focus of said lens and visible at the side facing said lens, and a reflector opposite and inclined to the other side of said image-plate and exposed to view and adjustable in an arc of a circle about the line of the optical axis of said lens, substantially as set forth.

4. In a solar surveying-instrument, the combination, with its solar lens, of a semi-transparent image-plate having on it hour and equatorial lines in the focus of said lens and exposed to view at the side facing said lens, and an attached magnifying eye-piece for inspecting the other side of said image-plate, substantially as set forth.

5. In a solar surveying-instrument, the combination, with its solar lens, of a semi-transparent image-plate having on it hour and equatorial lines in the focus of said lens and exposed to view at the side facing said lens, and a combined magnifying eye-piece and inclined reflector facing the other side of said image-plate, substantially as set forth.

6. In a solar surveying-instrument, the combination, with its solar lens, of a semi-transparent image-plate having on it hour and equatorial lines in the focus of said lens and exposed to view at the side facing said lens, and a combined magnifying eye-piece and inclined reflector facing the other side of said image-plate and adjustable in an arc of a circle about the line of the optical axis of said lens, substantially as set forth.

7. In a solar surveying-instrument, the combination, with its solar lens, of a semi-transparent image-plate having on it hour and equatorial lines in the focus of said lens, a reflector opposite and inclined to the side of the image-plate farthest from said lens, and a magnifying eye-piece facing and inclined to said reflector, substantially as set forth.

8. In a solar surveying-instrument, the combination, with its solar lens, of a semi-transparent image-plate having on it hour and equatorial lines in the focus of said lens, a reflector opposite and inclined to the side of the image-plate farthest from said lens and adjustable in an arc of a circle about the line of the optical axis of said lens, and a magnifying eye-piece facing, inclined to, and moving with said reflector, substantially as set forth.

9. In a solar surveying-instrument, the combination, with its solar lens and image-plate holder, of a semi-transparent image-plate having on it hour and equatorial lines in the focus of said lens and exposed to view at its two opposite sides, and the cylindrical tubular portion on said image-plate holder and surrounding, extending beyond, and shading the side of the image-plate farthest from said lens, substantially as set forth.

10. In a solar surveying-instrument, the combination, with its solar lens and image-plate holder, of a semi-transparent image-plate having on it hour and equatorial lines in the focus of said lens, the tubular portion on said image-plate holder, and surrounding and extending beyond the side of the image-plate farthest from said lens, a detachable hollow reflector-holder having a cylindrical part fitting said tubular portion and movable endwise and circumferentially in relation thereto, and a reflector in and carried by said reflector-holder and facing and inclined to its said cylindrical part and exposed to view, substantially as set forth.

11. In a solar surveying-instrument, the combination, with its solar lens, semi-transparent image-plate having on it hour and equatorial lines in the focus of said lens, and image-plate holder having the tubular portion around and beyond the side of the image-plate farthest from said lens, of a hollow reflector-holder having a cylindrical part fitting said tubular portion and movable circumferentially in relation thereto, a reflector in said reflector-holder and opposite and inclined to said cylindrical part, and a magnifying eye-piece facing and inclined to said reflector and carried by the reflector-holder, substantially as set forth.

In testimony whereof I hereunto set my hand, in the presence of two subscribing witnesses, this 6th day of December, 1889.

EDWARD W. ARMS.

Witnesses:
 PAUL COOK,
 JNO. C. HOUSE.